Figure 1:
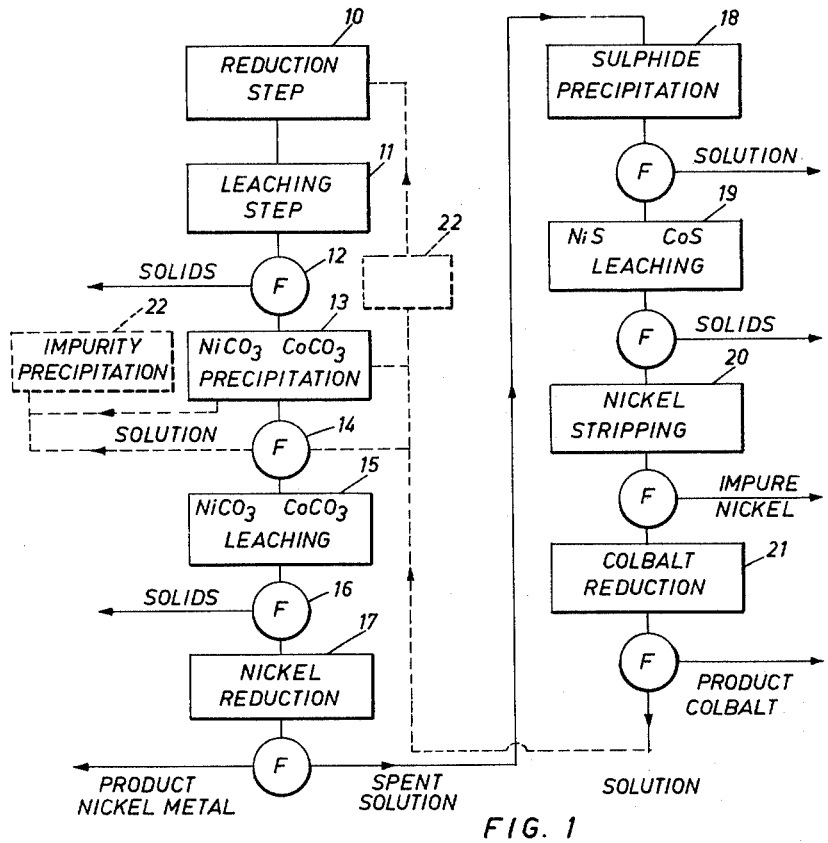

July 21, 1964  E. L. BROWN ETAL  3,141,765
PROCESS FOR THE PRODUCTION OF NICKEL AND COBALT FROM
NICKEL AND COBALT BEARING MATERIAL
Filed Nov. 12, 1959

Inventors
ELDON L. BROWN
V. N. MACKIW
by:

United States Patent Office 3,141,765
Patented July 21, 1964

3,141,765
PROCESS FOR THE PRODUCTION OF NICKEL AND COBALT FROM NICKEL AND COBALT BEARING MATERIAL
Eldon L. Brown, Mardon Farm, Uptergrove, Ontario, and Vladimir Nicolaus Mackiw, Fort Saskatchewan, Alberta, Canada, assignors to Sherritt Gordon Mines Limited, Toronto, Ontario, Canada, a company of Ontario
Filed Nov. 12, 1959, Ser. No. 852,438
4 Claims. (Cl. 75—103)

This invention relates to a method of separating and recovering nickel and/or cobalt as product metals substantially free from impurities from nickel and/or cobalt bearing material. It is particularly directed to providing an economic and commercially practical method of treating metal bearing material which contains desired nickel and/or cobalt values in the form of oxides.

Nickel and cobalt contained in oxidized ores, such as lateritic and garnieritic ores and in low grade sulphide ores which are not amenable to concentration by known ore concentrating processes constitute important sources of nickel and cobalt. There are known processes for the recovery of desired nickel and cobalt values from such nickeliferous and cobaltiferous materials. However, there are important economic and metallurgical problems in the treatment of such materials due to the complex nature of the ore, the relatively low nickel and/or cobalt contents, and the necessity of treating very large tonnages to obtain a commercially practical rate of production of desired metal.

One of the processes employed in the treatment of Cuban lateritic ore, known as the Nicaro process, involves the treatment of an ore in which the nickel is present in a complex oxide form of the general formula $2Ni.2MgO.3SiO_3.6H_2O$ (genthite); $(Ni.Mg)O.SiO_2.H_2O$ (garnierite); and $3(Ni.Mg).2SiO_2.2H_2O$ (nepolite). This process involves roasting the ore in a reducing atmosphere, using a solid reducing agent such as coal or coke fines, or a reducing gas such as hydrogen or carbon monoxide or mixtures thereof, to reduce the nickel oxide to crude metallic state. The reduced ore is leached with an aqueous ammoniacal ammonium carbonate solution to extract the nickel content and dissolve it in the leach solution as nickel ammine carbonate. Undissolved residue is separated from the leach solution and is discarded or passed to further treatment for the recovery of residual metal values. The solution is then heated, such as by distillation or steam stripping, to release ammonia and precipitate dissolved nickel as nickel carbonate. Precipitated nickel carbonate is separated from the solution, such as by filtration, and is decomposed by heating to form nickel oxide. The nickel oxide can be sold as such if there is an available market for it or it can be reduced in the solid state to metallic nickel by reaction with hydrogen.

A number of economic and metallurgical problems are encountered in the operation of this process. For example, cobalt usually is associated with the nickel in lateritic and garnieritic ores. Cobalt normally tends to dissolve in the ammoniacal ammonium carbonate solution as cobalt carbonate and to precipitate with the nickel carbonate. Thus, the nickel carbonate precipitated in the distillation step is contaminated by cobalt. Also, impurities such as magnesium tend to dissolve in the leach solution and precipitate with the nickel carbonate. These impurities remain with the nickel during the nickel carbonate decomposition step and the nickel oxide reduction step, thus contaminating the purity of the final nickel product metal. Procedures have been developed by which the leaching and nickel carbonate precipitation steps can be conducted to minimize the dissolution and precipitation of cobalt and other carbonate forming impurities, but such procedures result in the loss of desired nickel values in the leaching and nickel carbonate precipitation steps and, of course, the loss of the cobalt content of the ore. As the Cuban laterite ore treated by the Nicaro process contains from about 1.0% to about 1.25% nickel and from about 0.1% to about 0.125% cobalt, the non-recovery of the cobalt values as product metal represents an important economic loss in the overall potential value of the ore.

This type of reducing roasting, aqueous ammoniacal ammonium carbonate leaching process can also be employed in the treatment of low grade nickel sulphide ores which are not amenable to concentration by known concentrating processes. The sulphides are subjected to a preliminary oxidizing roast in which the nickel content is converted to oxide form. The roasted nickeliferous material is then subjected to the reducing roasting, leaching, distillation, nickel carbonate decomposition and nickel oxide reduction steps described above.

A further process for the treatment of garnieritic ore involves smelting the ore to produce a high nickel-low cobalt ferro-nickel alloy and a low nickel-high cobalt ferro-cobalt alloy. These alloys usually are not treated to produce product nickel and cobalt metals.

We have found that nickel and/or cobalt contained in lateritic and garnieritic ores can be produced therefrom as product metals substantially free from impurities with a high degree of extractive efficiency and at relatively low operating cost.

The improved process of this invention includes the steps of subjecting the nickel oxide bearing material to a preliminary reducing roasting operation in which a reducing agent such as coal or coke fines, hydrogen or carbon monoxide or a mixture thereof is employed to reduce the nickel oxide to crude nickel metal. Cobalt oxide present in the feed material is reduced to crude cobalt metal. This reducing step is, of course, a known procedure.

The reduced ore is leached with an aqueous ammoniacal ammonium carbonate solution. This step is conducted under conditions similar to those of the known, above described process with the important difference that it is a primary object of this improved process to obtain maximum extraction of the nickel and cobalt contents of the feed material. The dissolution of cobalt and other carbonate forming impurities, such as magnesium, does not in any way interfere with the purity of the final nickel and/or cobalt product metal or metals.

The precipitation of dissolved nickel and cobalt values as nickel and cobalt carbonate by distillation or steam stripping also is conducted under conditions similar to those of the known process but again with the important difference that it is conducted to obtain maximum precipitation of the dissolved nickel and cobalt values. Precipitated carbonates are separated from the solution, such as by filtering or centrifuging. The solution residue can be discarded or it can be recycled to the first leaching step, or it can be treated for the recovery of any residual dissolved metal values, as desired.

The precipitated carbonates are re-leached with a solvent in which they are completely soluble. Of the suitable solvents, an aqueous ammoniacal ammonium carbonate solution is preferred as it is available in the plant. However, it will be understood that other solvents can be employed such as ammonium sulphate and alkali metal hydroxide solutions and aqueous solutions of inorganic acids such as hydrochloric and sulphuric acid.

The resulting leach solution, after separation of undissolved solids, is reacted with a reducing gas, preferably hydrogen, at elevated temperature and pressure, to precipitate nickel as product metal substantially free from impurities. As the reducing reaction is acid forming, it usually is necessary to provide an acid neutralizing agent, such as ammonia, sodium hydroxide or the like, in amount sufficient to combine with the acid as it is formed and maintain the pH value of the solution within the range of from about pH 10 to about pH 2, in which range the reducing reaction proceeds rapidly and efficiently.

It is found when nickel and cobalt are present in the solution subjected to reaction with a reducing gas at elevated temperature and pressure that nickel can be precipitated from the solution to a nickel to cobalt ratio of about 1:1 without co-precipitation of appreciable cobalt. However, as the reducing reaction is continued beyond that ratio, progressively increasing amounts of cobalt are precipitated with the nickel. Thus, the reducing reaction is conducted to a nickel to cobalt ratio of not less than about 1:1. The product nickel, substantially free from cobalt, is separated from the solution and, after washing and drying, is ready for the market.

The residual solution, after separation of the product nickel metal, can then be reacted with hydrogen sulphide to precipitate the dissolved nickel and cobalt values as sulphides. The nickel-cobalt sulphides can be re-leached with an ammoniacal or sulphric acid solution under oxidizing conditions to re-dissolve the nickel and cobalt. The purpose of these steps is to reduce the volume of solution which is treated for the recovery of the dissolved cobalt. For example, the solution from the nickel reduction step may contain from 1 to 10 grams per litre of each of nickel and cobalt. The volume of the solution is, in effect, reduced by these sulphide precipitation and re-leaching steps to contain from about 25 to 40 grams per litre of each metal. The nickel can be precipitated from this solution by known procedures, without serious co-precipitation of cobalt, to a nickel to cobalt ratio of about 1:3000 to produce a solution from which, after separation of the precipitated nickel, product metal cobalt can be precipitated which contains as little as 0.03% nickel, by reacting the solution with a reducing gas such as hydrogen at elevated temperature and pressure.

Figure 2:
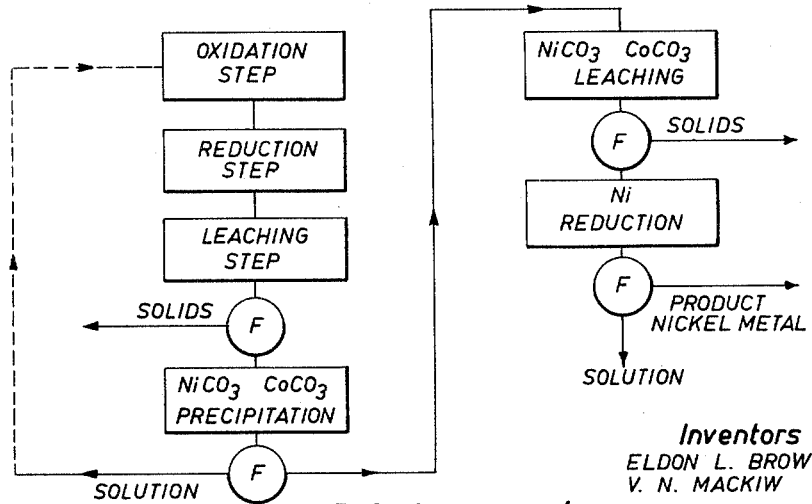

The improved process of this invention is described in detail hereinafter, reference being made to the accompanying drawings in which:

FIGURE 1 is a flow sheet of an embodiment of the process which is adapted to treat oxidized ores such as laterite and garnierite ores; and FIGURE 2 is a flow sheet of an embodiment of the process which is adapted to treat nickel and/or cobalt sulphide ores.

Like reference characters refer to like steps throughout the description and drawings.

Referring to FIGURE 1, the numeral 10 represents the reduction step in which the lateritic or garnieritic ore, which contains from about 1% to about 1.25% nickel and from about 0.1% to about 0.125% cobalt, is charged into a roasting furnace and is reacted with a reducing agent such as coal or coke fines, hydrogen or carbon monoxide or the like or mixtures thereof. This reducing reaction can be conducted in a conventional roasting furnace such as a multiple hearth furnace or a fluo-solids roaster. It is usually conducted at a temperature of from about 800° to 1700° F. and is continued to reduce the nickel and cobalt oxides to crude metallic state with minimum reduction of iron oxide to metallic iron. The reducing roasting reaction is conducted under conditions which yield maximum extraction of nickel and cobalt values in the subsequent leaching step.

The reduced calcine is passed to the leaching step 11 wherein it is dispersed in an aqueous ammoniacal ammonium carbonate leach solution to form a slurry which contains from about 20% to 40% solids. The leach solution should contain free ammonia and at least 1 mol of ammonium carbonate per mol of nickel plus cobalt and preferably a sufficient excess of ammonium carbonate as to ensure maximum extraction and dissolution of desired nickel and cobalt values. Some excess of ammonium carbonate should be available up to an excess of about 100 grams per litre to ensure that the reactions:

$$Ni + (NH_4)_2CO_3 + \tfrac{1}{2}O_2 \rightarrow Ni(NH_3)_2CO_3 + H_2O \quad (1)$$
$$Co + (NH_4)_2CO_3 + \tfrac{1}{2}O_2 \rightarrow Co(NH_3)_2CO_3 + H_2O \quad (2)$$

proceed to substantial completion. If a high leaching temperature is employed, for example about 180° F., the excess of ammonium carbonate should be maintained at a minimum due to the thermal decomposition of ammonium carbonate and the resulting high vapour pressures generated. Also, impurities, such as magnesium, tend to dissolve in increased amounts in the presence of higher ammonium carbonate concentrations. A free oxygen containing gas, such as air, is fed into the leaching tanks to facilitate the oxidizing reaction. The leaching reaction usually is conducted at a temperature of from about 60° to 200° F. and is continued to obtain optimum dissolution of nickel and cobalt regardless of the amount of carbonate forming impurities, such as magnesium, which may be dissolved in the leach solution.

On completion of the leaching step, the slurry is passed to a liquid-solids separation step 12 in which the undissolved solids are separated from the pregnant leach solution, such as by filtering or centrifuging. The solids can be discarded or passed to further treatment for the recovery of residual metal values, if desired.

The clarified leach solution which contains the dissolved nickel and cobalt carbonates is passed to the distillation step 13 in which the solution is maintained above its boiling temperature, for example about 220° F., to precipitate dissolved nickel and cobalt values as carbonates. This nickel-cobalt carbonate precipitation step is a known procedure and is conducted to obtain maximum precipitation of nickel and cobalt carbonates regardless of the impurities which may be precipitated concurrently therewith.

Precipitated nickel and cobalt carbonates are separated from the solution in a second liquid-solids separation step 14, such as by filtering or centrifuging.

Distillate from the heating step 13 and filtrate from step 14 preferably are recycled to the leaching step 11. At least a portion of the filtrate can be treated for the separation of dissolved impurities such as magnesium and aluminum compounds to prevent the accumulation of such compounds in the circulating solution to the extent that they would contaminate the purity of the product nickel and cobalt metals.

The precipitated nickel and cobalt carbonates are preferably washed to free them of entrained leach solution. They are then passed to leaching step 15 wherein they are dsipersed in an aqueous ammoniacal ammonium carbonate leach solution to form a slurry which contains from 20% to 40% solids. An important objective of this step is to obtain maximum dissolution of nickel and cobalt carbonate with minimum dissolution of impurities such as magnesium, aluminum, calcium and the like. Thus, sufficient free ammonia is provided in the solution to provide a ratio of from 2 to 3 mols of free ammonia per mol of nickel plus cobalt in the solution at the end of the leaching step and from 0 to 100 grams per litre of ammonium carbonate. In this, the addition of ammonium carbonate is not essential but it does improve the leaching rate. This leaching step is conducted at a temperature of from 60° to 210° F. and is continued to obtain maximum dissolution of nickel and cobalt. It can be conducted at higher temperatures, of course, but relatively costly pressure equipment would be required in view of the pressures generated. Also, in operating at above atmospheric temperature, impurities such as magnesium would tend to dissolve in the solution.

Undissolved residue from leaching step 15 is separated from the solution, such as by filtration in filter 16 or by centrifuging. The clarified pregnant leach solution is passed to reduction step 17 wherein it is reacted with a sulphur free reducing gas such as hydrogen, at a temperature within the range of from about 150° to about 450° F. and under a partial pressure of hydrogen of from about 20 to about 1,000 pounds per square inch. If the solution from leaching step 15 contains at least about 2 mols of ammonia per mol of nickel plus cobalt, sufficient neutralizing agent is present in the solution to neutralize the acid as it is formed during the reducing reaction and, thus, it is not necessary to provide neutralizing agent during the reaction. In this, the pH value of the solution should be maintained above about pH 2 to ensure precipitation of nickel from the solution to the desired extent. If the solution from the leaching step 15 is not within the necessary pH range and does not contain the required amount of neutralizing agent, these adjustments can be made by the addition of neutralizing agent prior to the initiation of or during the reducing reaction. Process for the precipitation of nickel and cobalt substantially free from solutions in which they are present as dissolved salts by reacting the solutions with a reducing gas at elevated temperature and pressure are fully described in United States Patents No. 2,734,821 issued February 14, 1956; No. 2,805,139, issued September 13, 1957; and Nos. 2,767,081; 2,767,082; and 2,767,083, issued October 16, 1956.

As stated hereinabove, cobalt tends to precipitate concurrently with the nickel as the nickel content of the solution is reduced to a nickel-cobalt ratio of about 1:1. Therefore, the reducing reaction preferably is terminated at that nickel to cobalt ratio at which there is very little, if any, co-precipitation of cobalt.

Precipitated nickel, substantially free from cobalt and other contaminating impurities, is separated from the reaction vessel and, after washing and drying, is ready for the market.

The solution from the nickel reduction step may contain small amounts of dissolved nickel and cobalt salts. If so, the solution can be treated relatively easily to recover them. A convenient method is to precipitate the dissolved nickel and cobalt salts as sulphides in a sulphide precipitation step 18, such as by reacting the solution with hydrogen sulphide. Precipitated sulphides are separated from the reacted solution, such as by filtration and are leached, in a leaching step 19, with an ammoniacal ammonium carbonate or ammonium sulphate solution in the presence of a free oxygen containing gas, to redissolve the nickel and cobalt to produce a solution which contains, for example, from 20 to 50 grams of each metal. Such a solution can be treated on an economically practical basis for the recovery of the dissolved nickel and cobalt values.

The solution, after separation of the undissolved residue is passed to a nickel stripping step 20. A satisfactory procedure for stripping the nickel from the solution is disclosed in United States Patent No. 2,822,262 and involves the steps of adjusting the pH value of the solution to between about pH 3.5 and 6.5 to precipitate the bulk of the nickel as nickel ammonium sulphate. This step can be effected with the co-precipitation of very little cobalt. The solution, after separation of the precipitated nickel ammonium sulphate, is reacted with a free oxygen bearing gas to convert the cobalt content of the solution to cobaltic state. Finely divided cobalt metal particles are added in amount equivalent to at least the amount of nickel dissolved in the solution. The solution is then reacted with a reducing gas such as hydrogen at a temperature above about 150° F. and under a partial pressure of reducing gas greater than about 200 pounds per square inch. This reducing reaction is continued until substantially all the nickel has been precipitated from the solution on the dispersed cobalt particles. This procedure has the advantage that the nickel to cobalt ratio in the solution can be reduced to about 3000:1 with co-precipitation of very little of the dissolved cobalt.

After separation of the composite nickel and cobalt particles from the solution, the solution can be reacted with a sulphur free reducing gas at elevated temperature and pressure in a cobalt recovery step 21 for the precipitation of the dissolved cobalt values in the same manner that the nickel is reduced to product metal.

Residual solution from the cobalt recovery step 21 can be recycled to leaching step 11. Preferably, at least part of this solution is treated in a distillation step 22 for the precipitation and separation of impurities such as magnesium, aluminum, calcium, and the like to prevent accumulation of such impurities in the circulating solution.

The modification of the process illustrated in FIGURE 2 is adapted to treat nickel and/or cobalt sulphide ores and concentrates. The metal bearing material is roasted in an oxidizing atmosphere at a temperature within the range of from about 1000° to 2000° F., preferably within the range of from about 1300° to 1600° F., to convert the nickel and cobalt sulphides to oxides. The roasted calcine is then subjected to a reducing roast to convert the nickel and cobalt oxides to crude metal. The resulting calcine is then treated by the sequence of steps described in detail hereinabove.

The following examples illustrate the improved results which can be obtained in the operation of the process of this invention.

EXAMPLE 1

This example illustrates the operation of the process in the treatment of a low grade nickel sulphide ore which was not amenable to concentration by conventional concentrating processes.

1000 grams of a pyrrhotite concentrate which contained about 1.0% nickel and 0.12% cobalt were roasted in an oxidizing atmosphere at a temperature of about 1400° F. in a fluo-solids roaster. After the oxidizing roasting step, the calcine was subjected to a reducing roast at a temperature of about 1250° F. The reducing agent was a mixture of carbon monoxide and hydrogen supplied at the rate of about 15 cubic feet per pound of calcine. The analysis of the concentrate, the oxidized calcine and the reduced calcine are set out in Table 1 below.

*Table 1*

|  | Ni | Co | Fe | S | Insol. |
| --- | --- | --- | --- | --- | --- |
| Concentrate | 1.02 | .12 | 48.4 | 29.4 | 17.6 |
| Calcine | 1.12 | .14 | 53.2 | .52 | 19.4 |
| Reduced Calcine | 1.19 | .15 | 56.6 | .27 | 22.6 |

The resulting calcine, which weighed 911 grams, was leached in 1,420 ml. of aqueous solution which contained 50 grams per litre of ammonium carbonate and 10 grams per litre of free ammonia. The leaching step was conducted in a stirred autoclave at a temperature of 150° F. Oxygen at a partial pressure of 20 pounds per square inch was fed into the autoclave during the leaching operation. At the end of 4 hours leaching, the leach solution contained 6.7 grams per litre nickel and 0.8 gram per litre cobalt. The undissolved residue, which weighed 902 grams, contained 0.08% nickel and 0.05% cobalt. 93.0% of the nickel and 64.3% of the cobalt were extracted from the calcine and dissolved in the leach solution.

This solution, after separation of the undissolved residue, was boiled at 220° F. at or near atmospheric pressure until substantially all the dissolved nickel and cobalt precipitated from the solution as mixed basic nickel and cobalt carbonates. After separation from the solution the precipitate weighed 25 grams and contained 41.6% nickel and 3.6% cobalt. The solution, which amounted to 1600 ml. contained no nickel or cobalt. The nickel-cobalt carbonate precipitate was dissolved in an ammoniacal ammonium carbonate solution which contained 28 grams per litre of ammonia. After separation of the undissolved residue, the clarified solution contained 45 grams per litre of nickel and 5 grams per litre of cobalt. This solution was heated to about 350° F. in a stirred autoclave. Hydrogen was admitted to the autoclave at a partial pressure of about 350 pounds per square inch and was supplied to the autoclave for about half an hour at the end of which substantially all the nickel in the solution was precipitated as nickel metal in the form of finely divided powder. This nickel powder which weighed 8.6 grams, was substantially pure nickel and contained only 0.2% cobalt. After separation of the precipitated nickel, the reacted solution contained 4 grams per litre of cobalt and 4 grams per litre of nickel. These metals were recovered from this end solution by known procedures. The recoveries were 85% of the nickel and 57.6% of the cobalt as product metals, and overall recoveries were obtained of 92.5% of the nickel and 62.5% of the cobalt, having regard to the mixed nickel-cobalt products recycled to the first leaching step.

EXAMPLE 2

1000 grams of lateritic nickel ore was reacted at 1400° F. with a gas mixture which comprised essentially carbon monoxide and hydrogen but which contained also inert gases such as nitrogen and carbon dioxide. The compositions of the ore and of the reduced calcine are set out in Table 2.

Table 2

|  | Ni | Co | Fe |
|---|---|---|---|
| Ore | 1.91 | .48 | 43.6 |
| Reduced Ore | 2.22 | .56 | 50.7 |

The resulting calcine weighed 860 grams and was leached in 2130 ml. of an ammoniacal ammonium carbonate solution wihch contained 10 grams per litre ammonia and 70 grams per litre ammonium carbonate at 150° F. under a partial pressure of oxygen of 20 pounds per square inch. The resulting solution, 2130 ml., contained 8.0 grams per litre nickel and 2.02 grams per litre cobalt. Over 90% of the nickel and 90% of the cobalt contents of the reduced calcine were dissolved in the leach solution. The solution, after separation of the undissolved residue, was boiled at 220° F. to expel excess ammonia and carbon dioxide and precipitate the dissolved nickel and cobalt values substantially completely as basic carbonates. The residual solution, 2500 ml., contained no nickel or cobalt. The carbonates, after separation from the solution by filtration, weighed 45 grams and contained 38% nickel and 9.57% cobalt. They were re-dissolved in an ammonia solution which contained 28 grams per litre of ammonia plus about 100 grams per litre ammonium carbonate. The resulting solution contained 45 grams per litre nickel and 10.2 grams per litre cobalt. Undissolved residue was separated from the solution. The solution was then heated to 350° F. in a stirred autoclave and hydrogen at 350 pounds per square inch partial pressure was admitted into the autoclave. The reducing reaction was continued until the nickel in the solution was reduced to 8 grams per litre. 14.1 grams of nickel metal powder were separated from the solution for a recovery of 74% of the nickel as product metal. The nickel dissolved in the end solution from the reduction step was precipitated as a mixed nickel-cobalt metal product to produce an overall nickel recovery of 88%. The total cobalt recovery as product metal and mixed nickel-cobalt metal was 61.5%.

EXAMPLE 3

1000 grams of garnierite ore were reacted with a reducing gas mixture under conditions similar to those set out in Example 2. The analyses of the ore and of the reduced calcine are set out in Table 3 below.

Table 3

|  | Ni | Co | Fe₂O₃ | MgO | Al₂O₃ | Cr₂O₃ | SiO₂ |
|---|---|---|---|---|---|---|---|
| Ore | 2.9 | .08 | 12.3 | 27.0 | .8 | .7 | 34.6 |
| Reduced Ore | 3.4 | .09 | 14.3 | 31.4 | .9 | .8 | 40.2 |

833 grams of reduced calcine were leached in 1400 ml. of an aqueous solution which had a pulp density of 37.8% solids and contained 10 grams per litre of ammonia and 70 grams per litre of ammonium carbonate. The resulting leach solution contained 19.4 grams per litre of nickel and 0.41 gram per litre cobalt. The undissolved residue, after separation from the leach solution, weighed 823 grams and contained 0.19% nickel. The solution, 1400 ml., contained 19.4 grams per litre nickel and 0.419 gram per litre cobalt. The solution was boiled at 220° F. to expel ammonia and carbon dioxide and to precipitate substantially completely the dissolved nickel as impure nickel carbonate. This nickel carbonate, after separation from the solution, weighed 53 grams and contained 48% nickel. It was re-dissolved in a solution which contained 29 grams per litre of ammonia to produce a solution which contained 45 grams per litre of nickel. This solution, after separation of the undissolved residue, was heated in a stirred autoclave to 350° F. Hydrogen was admitted to the autoclave at a partial pressure of 350 pounds per square inch. At the end of 30 minutes reaction period, substantially all the nickel was precipitated from the solution. The nickel powder was separated from the reduced solution and, after washing and drying, weighed 24.6 grams and had a purity of 99.8%. 87% of the nickel was recovered as product nickel metal and the overall nickel recovery was 90.2%. The reduced solution was treated by distillation to precipitate basic carbonates of magnesium, calcium and aluminum and was thereafter recycled to the first mentioned leaching step, free ammonia being added to the solution to produce a leach solution which contained 29 grams of ammonia per litre.

The process of this invention possesses a number of important advantages. Over 90% of the nickel contained in the starting material can be recovered as product nickel substantially free from impurities and with a cobalt content of less than 0.2% to 0.1%, if desired. The major portion of the cobalt contained in the starting material can be recovered as product metal substantially free from impurities. Types of lateritic, garnieritic and low grade sulphide ores can be treated by this process which heretofore could not be treated economically for the production of product nickel and cobalt metals which meet market requirements.

It will be understood, of course, that departures can be made from the preferred embodiments of the invention described and illustrated herein without departing from the scope of the invention as defined by the appended claims.

What we claim as new and desire to protect by Letters Patent of the United States is:

1. In a process for the production of a metal selected from the group consisting of nickel and cobalt from oxidized, lateritic and garnieritic nickel and cobalt ores in which the ore is roasted in a reducing atmosphere to reduce nickel and cobalt values to crude metallic state and finely divided particles of reduced ore are leached with an ammoniacal ammonium carbonate solution in the presence of a free oxygen containing gas, the improvement which comprises the steps of:

(a) continuing said leaching step to obtain substantially complete extraction of nickel and cobalt values therefrom and their dissolution in the leach solution as metal carbonates;

(b) separating undissolved residue from the leach solution;

(c) heating said solution to a temperature above its boiling temperature;

(d) continuing said heating step to effect substantially complete precipitation from said solution of dissolved nickel and cobalt values as metal carbonates;

(e) separating precipitated nickel and cobalt carbonates from the leach solution;

(f) re-leaching said nickel and cobalt carbonates with an aqueous solution whch contains a member selected from the group consisting of ammonia, ammonium carbonate, ammonium sulphate, alkali metal hydroxides and inorganic acids in amount in excess of that required to dissolve said precipitated nickel and cobalt carbonates;

(g) continuing said leaching step to obtain optimum dissolution of said precipitated nickel and cobalt carbonates;

(h) separating undissolved residue from the last-mentioned leach solution;

(i) reacting said last-mentioned leach solution with a sulphur-free reducing gas at a temperature of from about 150° F. to about 450° F. under a partial pressure of a sulphur-free reducing gas of from about 20 to about 1000 pounds per square inch;

(j) providing in said solution an acid neutralizing agent in amount sufficient to maintain the pH of said solution of from about 2 to about 10 during the reducing reaction;

(k) continuing said reducing reaction to precipitate nickel from said solution as product nickel metal particles substantially free from impurities; and (l) separating precipitated nickel metal particles from the last mentioned solution.

2. In a process for the production of nickel from oxidized lateritic and garnieritic nickel ores in which the ore is roasted in a reducing atmosphere to reduce the nickel content thereof to crude metallic state and finely divided particles of reduced ore are leached with an ammoniacal ammonium carbonate solution in the presence of a free oxygen containing gas, the improvement which comprises the steps of:

(a) continuing the leaching step to obtain substantially complete extraction of nickel from the reduced ore and its dissolution in the leach solution as nickel carbonate;

(b) separating undissolved residue from the leach solution;

(c) heating the solution to a temperature above its boiling temperature;

(d) continuing said heating step to effect substantially complete precipitation from said solution of dissolved nickel values as nickel carbonate;

(e) separating precipitated nickel carbonate from said solution;

(f) re-leaching said precipitated nickel carbonate with an aqueous leach solution which contains a member selected from the group consisting of ammonia, ammonium carbonate and ammonium sulphate in amount in excess of that required to dissolve said nickel carbonate;

(g) continuing said second mentioned leaching step to obtain optimum extraction and dissolution of the nickel content of the said precipitated nickel carbonate;

(h) separating undissolved residue from the last-mentioned leach solution;

(i) reacting said last-mentioned leach solution with a sulphur-free reducing gas at a temperature of from about 150° F. to about 450° F. and under a partial pressure of reducing gas of from about 20 to about 1000 pounds per square inch;

(j) providing in said solution an acid neutralizing agent in amount sufficient to maintain the pH value of said solution within the range of from about pH 2 to about pH 10 during the reducing reaction;

(k) continuing said reducing reaction to precipitate nickel as finely divided nickel particles substantially free from impurities from said solution; and (l) separating precipitated nickel metal particles from said solution.

3. The process according to claim 2 in which nickel carbonate precipitated from the first-mentioned ammoniacal ammonium carbonate solution is re-dissolved in an ammoniacal ammonium carbonate solution which contains from about 2 to about 3 moles of ammonia per mole of nickel and less than about 100 grams per litre of ammonium carbonate in excess of that required to combine with the nickel values as nickel carbonate.

4. The process according to claim 2 in which the reducing reaction is continued to precipitate nickel from said second-mentioned solution as product nickel metal particles substantially free from contaminating impurities; precipitated nickel particles are separated from the solution; and the residual solution is thereafter reacted with a sulphidizing agent to precipitate residual dissolved metal values therefrom as metal sulphides.

References Cited in the file of this patent
UNITED STATES PATENTS

| | | |
|---|---|---|
| 2,694,005 | Schaufelberger | Nov. 9, 1954 |
| 2,829,963 | Hixon et al. | Apr. 8, 1958 |
| 2,836,485 | Schaufelberger et al. | May 27, 1958 |
| 2,872,306 | Morrow | Feb. 3, 1959 |
| 2,913,334 | Dean | Nov. 17, 1959 |